United States Patent Office 3,509,567
Patented Apr. 28, 1970

3,509,567
SOLID STATE RADAR
Peter Joseph Bulman, Crowle, Worcester, England, assignor to National Research Development Corporation, London, England
Filed Aug. 23, 1968, Ser. No. 754,780
Claims priority, application Great Britain, Aug. 25, 1967, 39,181/67
Int. Cl. G01s 7/28; H03b 7/06
U.S. Cl. 343—17.1
8 Claims

ABSTRACT OF THE DISCLOSURE

A pulse radar includes a solid state microwave source, a power supply and means for applying the power supply to the microwave source for a short duration. The means for applying the power supply to the microwave source for a short duration may include a pulse forming network. The microwave source may be a Gunn diode and in that case the power applied to it may be higher than necessary for it to operate in the normal mode so that it operates in the avalanche mode, whereby a pulse of microwave energy that is shorter than the period of time for which power is applied to the Gunn diode is generated.

---

The present invention relates to radar.

With the coming of miniature microwave source such as the Gunn diode or transferred electron oscillator the possibilities of a small size radar based on such devices have been realised by many people. However, such radars have in general been continuous wave (CW) radars, which are unsuitable for determining range information, and up to now no workable precision pulse radar has been developed. The problem of pulsing a microwave source with pulses shorter than 10 nanoseconds is apparently a difficult one, as will be seen by analogy with more conventional microwave sources such as klystrons and magnetrons which will not respond to very short driving pulses, for example.

It is an object of the present invention to provide a high resolution pulse radar whose source of microwave power is a miniature solid state device such as the Gunn diode.

According to the present invention there is provided a radar including a solid state micowave source, a power supply, and means for applying the power supply to the microwave source for a short duration. The means for applying the power supply to the microwave source for a short duration may include a pulse forming network.

A small amount of microwave power may be fed to the microwave source before the first mentioned power supply is applied to the microwave source. The microwave source may be a Gunn diode and in that case the power applied to it may be higher than necessary for it to operate in the normal mode so that it operates in the avalanche mode, whereby a pulse of microwave energy that is shorter than th period of time for which power is applied to the Gunn diode is generated.

Embodiments of the invention will be described by way of example with reference to the accompanying drawings, in which.

Figure 1:
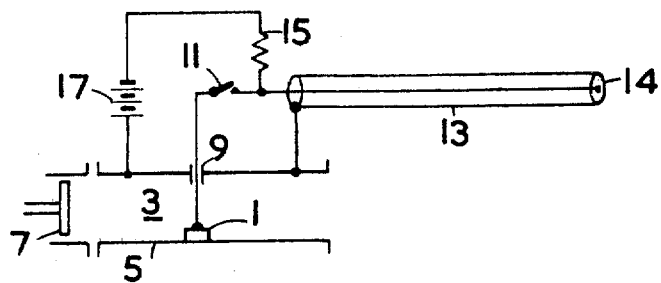
FIGURE 1 is a circuit diagram of part of a radar transmitter.

FIGURE 1 is a circuit diagram of part of a radar transmitter in which a Gunn diode 1 is situated in a cavity 3 at the end of waveguide 5. The cavity is tuned by a short circuit 7. One of the terminals of the Gunn diode 1 is connected to the wall of the waveguide 5 and the other is connected, via an RF bypass 9 in the wall of the waveguide 5, to a switch 11. The switch 11 will in general be an avalanche transistor, and is shown conventionally as a mechanical switch. The end of the switch 11 remote from the waveguide 5 is connected to one end of the inner conductor of a delay line 13 the other end of which is terminated by an open circuit 14. The outer conductor of the delay line 13 is connected to he wall of the waveguide 5, and the inner conductor (at the same end as the switch 11) is charged through a large resistance 15 from a voltage source 17.

The action of the circuit will be explained by reference to FIGURE 2, which is a series of waveforms, plotted against time, of voltages occurring in the circuit.

Oscillation in the Gunn diode 1 is caused by closing the switch 11 (i.e. causing the avalanche transistor to conduct). When the switch 11 is closed the energy stored in the day line 13 is supplied to the Gunn diode 1 causing it to oscillate. The energy is also propagated along the delay line 13 and reflected at the open circuit 14 so that after a time 2T, where T is the delay line 13, no more energy is available at the Gunn diode 1, and it is extinguished. By this known arrangement a pulse of a few nanoseconds is made available to the Gunn diode 1, and the Gunn diode 1 is caused to oscillate and extinguish at the beginning and the end respectively of the pulse.

Figure 2:
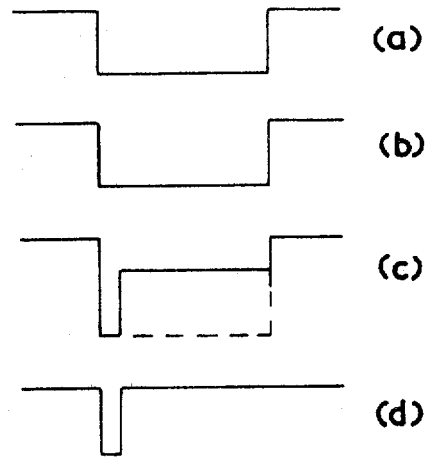
FIGURE 2 is a series of waveforms, plotted against time, of voltages occurring in the circuit illustrated in FIGURE 1.

In FIGURE 2 a waveform (a) represents the energy supplied to the Gunn diode, and a waveform (b) represents the period of oscillation, and therefore the length of the RF pulse emitted by the Gunn diode 1.

By the above mentioned arrangement a very short pulse of RF energy can be generated and transmitted. This is of course impossible at the present moment with magnetrons or klystrons by applying pulsed power to them.

If the charge stored in the delay line 13 is significantly more that required to make the Gunn diode 1 avalanche, for example about 10% higher than the minimum charge required, microwave radiation is produced which is cut off very sharply when the Gunn diode avalanches. In particular, if the driving pulse has a sharp front edge (i.e. a fast rise time), a very short pulse, shorter than the driving pulse, can be produced. A waveform (c) in FIGURE 2 represents the voltage applied to the Gunn diode 1 when it is overdriven and a waveform (d) in FIGURE 2 represents the RF output of the diode. When the Gunn diode 1 avalanches its impedance changes greatly, so that the voltage applied from the switch 11 will change with the different states of the Gunn diode 1 (avalanching and not avalanching). Therefore in FIGURE 2(c) the voltage that would be available if the diode 1 were not avalanching is indicated by a broken line; the broken line can be thought of as an indication of the charge available for the Gunn diode 1. The actual voltage applied to the Gunn diode is indicated by the continuous line of FIGURE 2(c), and the period for which the Gunn diode 1 is oscillating is indicated by the waveform in FIGURE 2(d). When the Gunn diode 1 avalanches its impedance falls sharply, thereby reducing the voltage available from the switch 11.

This arrangement, by which the Gunn diode quenches itself after a very short time, produces a very short transmitted pulse.

Figure 3:
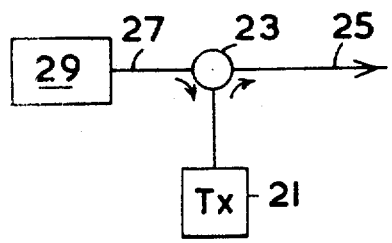
FIGURE 3 is another circuit diagram of part of a radar transmitter.

FIGURE 3 is another circuit diagram of part of a radar transmitter. A transmitter 21 is connected to a circulatar 23. The circulator 23 has an output waveguide 25 arranged to carry the output of the transmitter 21, and an input waveguide 27 to which is connected a source 29 of low power microwaves. The waveguide 27 is arranged to feed the transmitter 21 via the circulator 23.

The action of the circuit is as follows. The source 29 of microwaves is arranged to feed microwave power into the transmitter cavity 21 before the transmitter driving pulse is applied, as described above with reference to FIGURE 1. For example the source 29 may be a continuous wave microwave source. By this arrangement an improvement in pulse to pulse uniformity of amplitude in the output waveguide 25 is achieved. The power level of the source 29 should be in the order of 1% of that of the transmitter 21.

I claim:

1. A radar comprising a waveguide, a Gunn diode mounted in said waveguide, means for applying to said Gunn diode continuous microwave power at a relatively low power level insufficient to drive said Gunn diode into oscillation and means for applying to said Gunn diode a pulse of short duration relative to one microsecond of microwave power at a relatively high power level sufficient to drive said Gunn diode into oscillation.

2. The radar defined in claim 1 wherein said means for applying said short pulse is adapted to apply a pulse of a duration less than 10 nanoseconds to said Gunn diode.

3. The radar defined in claim 1 wherein said means for applying a short pulse includes a pulse forming network.

4. The radar defined in claim 3 wherein said pulse forming network includes an open circuited delay line for supplying energy to said Gunn diode.

5. A radar comprising a waveguide, a Gunn diode mounted in said waveguide, means for applying to said Gunn diode continuous microwave power at a relatively low power level insufficient to drive said Gunn diode into oscillation and means for applying to said Gunn diode a pulse of microwave power having a short duration compared with one microsecond and at a relatively high power level sufficient to drive said Gunn diode into oscillation, wherein said means for applying said short pulse to said Gunn diode is adapted to apply a sufficiently high power level to drive said Gunn diode into avalanche after a short period of microwave oscillation thereby quenching the microwave oscillation at the outset of the avalanche producing a very short pulse of microwave power.

6. The radar defined in claim 5 wherein said means for applying said short pulse is adapted to apply a pulse of a duration less than 10 nanoseconds to said Gunn diode.

7. The radar defined in claim 5 wherein said means for applying a short pulse includes a pulse forming network.

8. The radar defined in claim 7 wherein said pulse forming network includes an open circuited delay line for supplying energy to said Gunn diode.

References Cited

UNITED STATES PATENTS

| 3,088,052 | 4/1963 | Clark et al. | 328—67 XR |
| 3,336,535 | 8/1967 | Masher | 331—107 |
| 3,366,805 | 1/1968 | Bear et al. | 331—107 XR |
| 3,408,594 | 10/1968 | Allen et al. | |
| 3,454,946 | 7/1969 | Warren et al. | 343—17.1 |

OTHER REFERENCES

Thomas: "Frequency Modulated Gunn Oscillator," RCA Tech. Note No. 687, January 1967.

Dobriner, R.: "Pace of Gunn-Effect Research Quickens," Electronic Design, pp. 17–21, Jan. 18, 1966.

RICHARD A. FARLEY, Primary Examiner

T. H. TUBBESING, Assistant Examiner

U.S. Cl. X.R.

307—299; 317—234; 331—107; 332—9; 333—80, 95